No. 830,454. PATENTED SEPT. 4, 1906.
J. H. SAGER.
CONTROLLING SPRING FOR VEHICLES.
APPLICATION FILED DEC. 20, 1905.
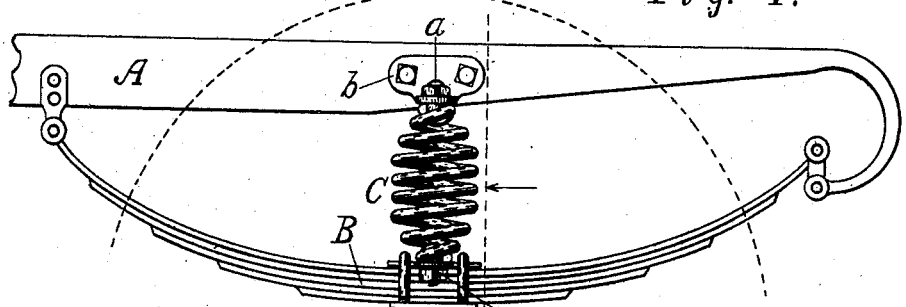
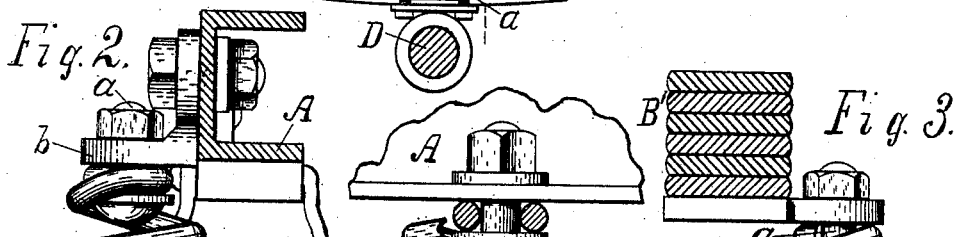 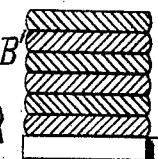
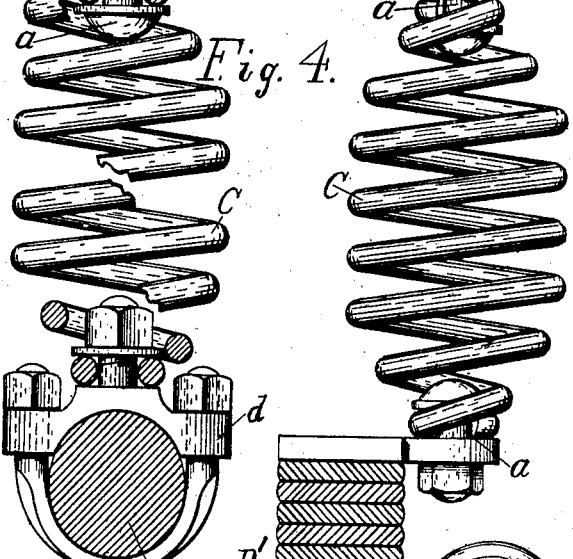
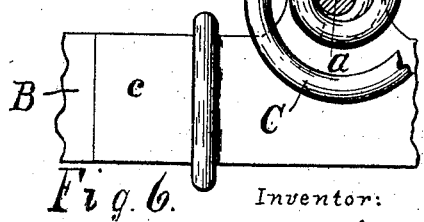
Attest:
A. M. Whitmore
J. M. Deyo
Inventor:
James H. Sager.
by C. B. Whitmore, Atty

UNITED STATES PATENT OFFICE.

JAMES H. SAGER, OF ROCHESTER, NEW YORK, ASSIGNOR TO J. H. SAGER COMPANY, OF ROCHESTER, NEW YORK.

CONTROLLING-SPRING FOR VEHICLES.

No. 830,454.　　　Specification of Letters Patent.　　　Patented Sept. 4, 1906.

Application filed December 20, 1905. Serial No. 292,598.

*To all whom it may concern:*

Be it known that I, JAMES H. SAGER, of Rochester, in the county of Monroe and State of New York, have invented a new and useful Improvement in Controlling-Springs for Vehicles, which improvement is fully set forth in the following specification and shown in the accompanying drawings.

My invention is a double-acting controlling-spring, preferably of coiled wire, for wheeled vehicles generally, it being designed more particularly for use on the heavier class of vehicles, as automobiles and freight-wagons, to modify and control the injurious and at times dangerous bounding or jumping of the body of the vehicle when moving rapidly over roads that are rough and uneven. When while speeding an automobile, for example, the wheels strike an irregular spot in the road and are thereby suddenly lifted, a severe strain is suddenly brought upon the springs supporting the load, acting to flatten or compress them, and the immediate return of the springs to their former shape or curvature will frequently throw the body of the car violently upward, not only endangering the springs and their fastening with other parts of the vehicle, but also disagreeably jolting and annoying the occupants of the car. It is mainly to remedy and overcome this particular difficulty and prevent the upward throwing of the body of the car that I have thought out and produced my present invention.

Springs known as "auxiliary" springs have been used with elliptical and other principal springs of vehicles to receive and sustain a part of the severe compressive action the principal springs are at times subjected to, and so aid in supporting the load carried; but such auxiliary springs only aid the principal springs in the matter of supporting or sustaining the load carried and do not in any way act to modify or control the violent recoveries of the principal springs or prevent the upward throwing of the body of the car and the passengers, frequently resulting in violent shocks and dangerous bumping of the axles, all of which dangers and difficulties I aim to modify and prevent by means of my present invention.

The main aim and object of the invention herein shown and described is to construct suitable springs, preferably of steel wire, and so place them at convenient points between the running-gear and the frame or body of a car or vehicle as to prevent the body from being thrown upward by the resilience of the principal springs in their recovery after being suddenly compressed or strained on account of the wheels passing over inequalities or rough spots in the road-bed.

Other objects and advantages of the invention will be brought out and made to appear in the following specification and the novel construction more particularly pointed out in the appended claims, reference being had to the accompanying drawings, which, with the reference characters marked thereon, form a part of this specification.

Figure 1 is a side elevation of a portion of the frame of an automobile and single elliptical spring, showing my improved controlling-spring in place thereon. Fig. 2 is a rear elevation of the parts seen as indicated by arrow in Fig. 1, the vertical section being as on the dotted line at the point of the arrow. Fig. 3 shows the controlling-spring in side elevation connected with a double elliptical principal spring, the two parts of the elliptical spring being in central vertical transverse section. Fig. 4 shows the controlling-spring connected with the axle and the frame independent of the principal springs of the vehicle, parts being broken away and vertically sectioned through the axis of the spring. Fig. 5 is a plan of the lower spring-holder shown in Fig. 4. Fig. 6 is a plan of the lower spring-holding plate shown in Fig. 2, parts being broken away and the clamp-bolt horizontally sectioned just beneath the head. Figs. 2 to 6, inclusive, are drawn to a scale larger than that of Fig. 1.

In the drawings, A, Figs. 1 and 2, represents a portion of the frame of an automobile, or it may be a freight-wagon or other vehicle, of ordinary construction, and B a single elliptical spring of common make held beneath the frame A.

C is my double-acting controlling-spring of steel spiral wire. These controlling-springs are preferably made with reduced conical ends and when in place on a vehicle occupy vertical positions, the ends being held by short bolts or fasteners *a* to adjacent parts of the vehicle, as clearly shown in Figs. 1 to 4, inclusive.

In Figs. 1 and 2 is shown a single elliptical main or principal spring B beneath the frame A, with the double-acting controlling minor spring C between them, secured at the upper end to a rest b on the frame and at the lower end to a plate c upon and secured to the principal spring B. The spring C is of such relative length and so attached that it acts to pull the frame downward against the spring B when the car is light and without load, said spring C being brought into a normal state or condition of idleness only when the body of the car with an average load presses hard down against the principal spring B and flattens its form or curvature. From this it will be understood that a sudden upward movement of the axles D from any cause, tending momentarily to further flatten the elliptical springs B, would be opposed by all the springs B C; but in their recovery an instant later the resulting upward rebound of the body and the load would be instantly opposed and controlled by the springs C pulling downward upon them, acting in a reverse manner or directly opposite to the manner in which they acted a moment before when resisting the downward pressure upon them. This reverse action or downward pull of the controlling-springs C begins, as it will be understood, at the instant the loaded body in its rebound after being abnormally depressed reaches the point or relative level at which the springs C stand neutral or idle, which position or level is, as previously stated, the natural relative position of the loaded body upon the principal springs, as when standing idle. The vehicle is provided with such a number of the controlling-springs as is found necessary, and their combined downward pull, as stated, serves to catch the upward-bounding body and prevent it rising far above its natural level, back to which it falls with an easy movement, and the vibration ceases. Particularly are these controlling-springs desirable and necessary on the more recent high-power touring-automobiles with which rapid runs are frequently made over country roads that are rough and uneven. It frequently occurs in such cases, as is well known by tourists, that the rough spots in the road-bed are so spaced as to act isochronously against the wheels, causing the vibrations to rapidly augment and increase in violence until the pounding of the axles is unbearable and dangerous, necessitating an unwished-for quick lowering of the speed. These controlling-springs, simple in form, but disposed as stated, serve to modify and neutralize this pounding of the body and permit rapid speeding of the automobile over rough roads without danger to the parts or discomfort to the passengers, this bounding of the car, if uncontrolled, frequently leading to the breaking of the transmission rod or gear, the crank-axle of the engine, the chain and other parts, besides the occasional bursting of a tire. One of these controlling or catch springs C is shown in Figs. 1 and 2, as previously stated, connected between a single elliptical spring and the frame of the vehicle and in Fig. 3 as employed between the two members of a double elliptical spring B'; but it is here pointed out that these controlling-springs need not necessarily be associated with any other springs of the vehicles. Fig. 4 shows a controlling-spring placed between and connected with the axle D and the frame A independent of all other springs, the controlling-springs being disposed in every case with reference to the particular build or plan of the automobile and placed anywhere where most convenient between the running-gear and the superincumbent body or parts connected with said running-gear and body. The springs being thus placed between these upper and lower main parts of the vehicle, that move vertically toward and from each other when jolting, act to bring the body back to its normal relative place at all times whether below or above said place.

When attached to a double elliptical spring B', as shown in Fig. 3, the controlling-spring C is at the middle or widest part of the elliptical spring, over the axle, and acts between the upper and lower members of said elliptical spring to directly effect or control its vertical dimension. The springs B' and C are constructed and connected in such manner that their forms or positions of idleness do not harmonize or agree, the idle point of the former spring being above that of the latter— that is to say, if the spring B' be in its neutral form or idle the spring C will be strained or out of natural form, and if the spring C be in its natural form and position of rest the spring B' will be under a stress and out of natural form. If, to further specify, the spring B' be without superincumbent load, it will normally assume a form broad at the middle, drawing the spring C into an abnormal elongated form; but if the spring B' be gradually loaded it will proportionately flatten at the middle, allowing the spring C to return toward its normal length and form and finally fully recover or reach its form of idleness as the load on the spring B' is increased. A further increase of the load will compress the spring C and be met by the combined action of both springs, and if while both springs are depressed by the load the latter be gradually lessened the spring C will again reach its neutral point or form of idleness and thence act with the load against the principal spring B' by pulling downward.

There is no time during the actions or movements of the two springs B' and C when both are simultaneously at rest or idle. The actions of both springs are in both directions from their respective neutral points, alternately pushing and pulling; but the middle movements of the springs take place successively and are at no time simultaneous. On account of these contrary actions of the combined springs the minor vertical springs are enabled to check and control the ordinary bounding of the body of the vehicle, as stated.

What I claim as my invention, and desire to secure by Letters Patent, is—

1. In combination with the main supporting-spring of the body of a wheeled vehicle, an endwise-compressible secondary spring disposed at right angles to and connected at its ends with said main spring; each spring having a form of inaction said forms occurring in succession during the movements of the springs and lateral rests for the auxiliary spring, with means connecting the ends of the spring with the rests.

2. In combination with the main supporting-spring of the body of a wheeled vehicle, an endwise-compressible secondary spring disposed at right angles to and connected at its ends with said main spring said secondary spring acting at intervals with the load to compress the main spring and lateral rests for the auxiliary spring, with means connecting the ends of the spring with the rests.

In witness whereof I have hereunto set my hand, this 16th day of December, 1905, in the presence of two subscribing witnesses.

JAMES H. SAGER.

Witnesses:
 E. B. WHITMORE,
 A. M. WHITMORE.